US012603423B2

(12) United States Patent
Talai et al.

(10) Patent No.: US 12,603,423 B2
(45) Date of Patent: Apr. 14, 2026

(54) RADOME DESIGN

(71) Applicant: Aptiv Technologies (2) S.à r.l., Luxembourg (LU)

(72) Inventors: Armin Talai, Nuremberg (DE); Syed An Nazmus Saqueb, Westfield, IN (US); Maximilian Hofmann, Nuremberg (DE)

(73) Assignee: Aptiv Technologies AG, Schaffhausen (CH)

( * ) Notice: Subject to any disclaimer, the term of this patent is extended or adjusted under 35 U.S.C. 154(b) by 123 days.

(21) Appl. No.: 18/240,742

(22) Filed: Aug. 31, 2023

(65) Prior Publication Data

US 2024/0072429 A1     Feb. 29, 2024

(30)     Foreign Application Priority Data

Aug. 31, 2022     (EP) ..................................... 22193188

(51) Int. Cl.
    *H01Q 1/42*        (2006.01)
    *G01S 7/02*        (2006.01)
    *H01Q 1/32*        (2006.01)
(52) U.S. Cl.
    CPC .............. *H01Q 1/42* (2013.01); *G01S 7/027* (2021.05); *H01Q 1/32* (2013.01)
(58) Field of Classification Search
    CPC .......... H01Q 1/42; H01Q 1/32; H01Q 1/3233; H01Q 1/36
    See application file for complete search history.

(56)                References Cited

U.S. PATENT DOCUMENTS

| | | | |
|---|---|---|---|
| 2007/0241962 A1* | 10/2007 | Shinoda ................. | H01Q 1/425 |
| | | | 342/361 |
| 2018/0233812 A1 | 8/2018 | Kim et al. | |
| 2018/0351274 A1 | 12/2018 | Callewaert | |
| 2019/0097301 A1* | 3/2019 | Wu ........................... | H05K 5/03 |
| 2019/0190135 A1 | 6/2019 | Tokunaga et al. | |
| 2020/0365980 A1* | 11/2020 | Tsuchiya ................. | H01Q 1/42 |
| 2021/0181298 A1 | 6/2021 | Hong et al. | |
| 2022/0179039 A1 | 6/2022 | Saqueb et al. | |

FOREIGN PATENT DOCUMENTS

JP          2008249678 A      10/2008

OTHER PUBLICATIONS

Extended European Search Report for EP 22193188.4 dated Feb. 14, 2023, 10 pages.

* cited by examiner

*Primary Examiner* — Hoang V Nguyen
(74) *Attorney, Agent, or Firm* — Miller Johnson

(57)                ABSTRACT

A system includes an antenna configured to emit electromagnetic waves. The system includes a radome having an interior surface facing the antenna. The interior surface at least partially includes a wave-shaped structure configured to reduce reflections of the electromagnetic waves off the interior surface and to increase transmission of the electromagnetic waves through the radome.

18 Claims, 5 Drawing Sheets

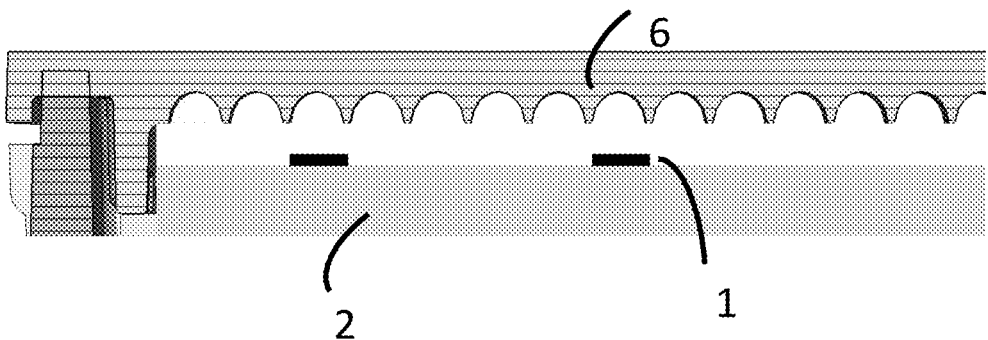
Fig. 7
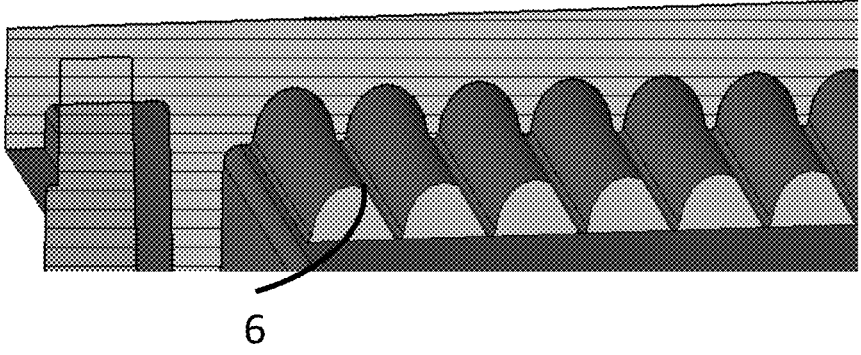
Fig. 8
Fig. 9

RADOME DESIGN

CROSS-REFERENCE TO RELATED APPLICATIONS

This application claims priority to EP App. No. 22193188 filed Aug. 31, 2022, the entire disclosure of which is incorporated by reference.

FIELD

The present disclosure relates to radar systems and, more particularly, to radar systems for automotive applications, including radomes for radar systems.

BACKGROUND

In automotive application, sensors are used for preventing car crashes, for following another vehicle, and the like. Also for automotive industry, such sensors are indispensable for sensing the surrounding in a reliable and efficient manner. Other industries, moving to autonomous solutions, also require such sensors.

For this and other purposes, radars are being utilized. A radar antenna radiates an electromagnetic wave, e.g. of a millimeter band, in a desired direction and receives a reflected wave from objects in front of the radar to detect possible objects. A radar system may comprise a planar-shaped antenna array, covered by a flat radome forming a protective structure of the antenna array. A radome may be a structural, weatherproof enclosure that protects a radar antenna. In automotive applications, a radome may be an integral part of the automotive facia. Generally, a radome may be made from a flat sheet of a material that only minimally attenuates the electromagnetic radiation transmitted or received by the antenna, with a selected thickness depending on the wavelength of the antenna array at zero-degree angle-of-incidence, in order to achieve a maximum transmission or a minimum reflection at this point. It is generally desirable that the emitted radiation is not impaired by the radome.

For radar antennas with a wide field of view, e.g. covering an azimuthal range of +/−75°, a flat radome is exposed to a large range of incidence angles. However, as transmission through flat radomes is only optimized for a particular incident angle (typically zero-degree angle-of-incidence), there are strong reflection losses at other angles (particularly high incidence angles). Modifying the radome thickness to optimize the radome for larger incident angles can in turn result in severe degradation at low incident angles.

FIG. 1 illustrates a prior art design of an automotive radar system. An antenna 1 (comprising e.g. one or more antenna arrays) is placed on an antenna board 2. The antenna has a field of view 4, which can have a wide angular coverage of e.g. −75° to +75°. A flat radome 3 is located in front of the antenna 1 at a particular distance. According to the prior art, the bottom surface 5 of the radome 3 is designed as a flat surface.

FIG. 2 is based on the prior art design of FIG. 1 and illustrates the path of an example electromagnetic ray. The ray is emitted from the antenna 1 under a large emission angle, the large emission angle being relative to the surface normal of the antenna board 2. Upon impinging on the bottom surface 5 of the flat radome 3, a part of the radiation is reflected and another part of the radiation enters the radome material for transmission (and partial absorption). For the prior art design illustrated in FIGS. 1 and 2, for large incident angles, a large portion of the radiation is reflected, which significantly impairs the accuracy and overall quality of the radar system. Although the antenna itself may have a large field-of-view, the field-of-view of the overall system is reduced. This is undesired.

US 2022/0179039 A1 describes a facia supporting an ultra-wide radar field-of-view. The facia may be configured as a radome having on at least one of the interior surface or the exterior surface a respective pattern of hemispherical indentations or domes that are configured to trap light, the trapping of the light being effective to reduce reflections off that surface and increase light transmission through the facia to support an ultra-wide field-of-view using the antenna despite the facia obstructing the field-of-view of the antenna. Each hemispherical indentation includes an opening that is perpendicular to the antenna. The opening forms a horizontal plane between the antenna and the interior surface, which is perpendicular to a polarization of an incident wave to the facia. The opening and the interior surface are configured to form a plane of incidence that is perpendicular to the facia. However, while these hemispherical indentations or domes may mitigate the reflection at high incident angles, the manufacturing of such a pattern has proven to be very difficult.

SUMMARY

There is thus a general need for an improved radome design particularly for application with wide or ultra-wide field-of-view radar antennas. A particular object of the present invention is to provide an improved radome which can be manufactured with reduced additional effort.

A solution is provided according to the subject matter of the independent claims.

According to one aspect of the invention, a system is provided which may particularly be a radar system for automotive application. For example, the system may be a radar system to be employed in an autonomous vehicle to facilitate navigation and monitoring of the surroundings of the vehicle. However, the applicability of the claimed system is not limited to this aspect.

The system comprises an antenna. The antenna is configured for emitting/radiating electromagnetic waves, such as in a desired direction. The antenna may have a field-of-view that opens around the desired direction. The antenna may be a radar antenna. For example, the antenna may work in the 30 MHz to 300 GHz range, such as in the X-band (8-12 GHz), K-bands (12-40 GHz), V-band (40-75 GHz), or W-band (75-110 GHz). In various implementations, the antenna works in the millimeter wave frequency band or EHF-band, ranging from 30 to 300 GHz. The antenna may work in a frequency band applicable for radar applications. In various implementations, the antenna works in the 76-81 GHz range.

In various implementations, the same antenna is also configured for receiving a wave reflected back from an object. In various implementations, the antenna is configured as a transmit antenna, and the system further comprises a separate receive antenna configured for the wave detection. Such configurations are known to the skilled person from the prior art.

The system further comprises a radome. The radome may be a structural element enclosing the antenna at least partially, and may protect the antenna from environmental influences. The radome may be formed by a part of a vehicle, e.g. a mirror housing, an emblem, a panel, a door, a bumper, etc., which may be part of an automotive facia. The facia may provide for aesthetic, aerodynamic, and protective benefits. The radome may also be provided as a separate element. In automotive applications, for example, the radome itself may be covered by a part of an automotive facia. The radome may be made of a material that only minimally attenuates the electromagnetic radiation. For example, the radome may be manufactured from a dielectric material, e.g. from plastic. In various embodiments, the radome may comprise one or more of polybutylene terephthalate, fiberglass, and acrylic glass.

The radome has an interior surface facing the antenna. In other words, the radome may be provided at least partially within the field-of-view of the antenna, such that electromagnetic waves radiating from the antenna are at least partially impinging on the interior surface of the radome. In various implementations, no other elements are provided between the antenna and the interior surface of the radome, at least within the field-of-view of the antenna.

According to the invention, the interior surface of the radome at least partially comprises a wave-shaped structure. The interior surface of the radome facing the antenna is thus structured in a particular manner to improve the prior art design. Instead of providing a flat surface or a pattern of hemispherical indentations or domes, the interior surface of the claimed system is waved; the interior surface may be wavy or undulating. Accordingly, the interior surface may have a structure of alternating bulges and recesses. In various implementations, the wave-shaped structure is formed by a plurality of alternating bulges and recesses. The bulges and recesses may merge homogeneously and steady, for example corresponding to a periodic function. In various implementations, the bulges and recesses have the same dimension. In various implementations, the recesses are larger than the bulges.

The wave-shaped structure is configured to reduce reflections of the electromagnetic waves off the interior surface and to increase transmission of the electromagnetic waves through the radome. This improvement (reduced reflection and increased transmission) may be in comparison to a radome design with a flat interior surface. Electromagnetic waves radiating from the antenna are impinging on the waved-shaped structure of the radome, wherein the incidence angle is on average lowered compared to a radome design with a flat interior surface. The lowered incidence angles facilitate coupling of the electromagnetic waves into the radome material, such that the reflected part is reduced.

The inventors have recognized that the prior art solution of providing a pattern of hemispherical indentations or domes is unfavorable when it comes to the manufacturing of the radome. In view of this drawback, the inventors have surprisingly found that a wave-shaped structure is highly beneficial. It is easy to manufacture (also in mass-production), for example by using injection-molding techniques, and at the same time reduces reflections to increase the overall performance of the radar system. Particularly, the wave-shaped structure has a lower requirement for manufacturing tolerances. Manufacturing-related deviations from the desired structure causes no or only a slight deterioration of the transmission/reflection quality of the radome as for the prior art design with hemispherical indentations or domes, where already small deviations of the structure could have drastic effects.

In various implementations, a wavelength characterizing the wave-shaped structure is smaller than a wavelength corresponding to the operating frequency of the antenna. For example, the wavelength characterizing the wave-shaped structure is smaller than half the wavelength corresponding to the operating frequency of the antenna. As will be understood by the person skilled in the art, the wavelength of the wave-shaped structure may correspond to the distance between two adjacent recurring wave structure element, and may correspond to the distance between two adjacent recurring bulges (or recesses). By providing for a relatively small wavelength of the wave-shaped structure, the transmission characteristics of the radome are improved. For example, in various implementations, the operating frequency of the antenna may be in the range of 76-81 GHz (with a wavelength of e.g. 3.8 mm), and the wavelength characterizing the wave-shaped structure may be smaller than 3.7 mm, or may be smaller than 1.9 mm. The wavelength may be uniform at least in the area of the interior surface being within the field-of-view of the antenna.

In various implementations, the system covers an azimuth field-of-view ranging from −50° to +50°, or from −75° to +75°. Along the elevation, the system may cover a field-of-view ranging from −6° to +6°, or from −10° to +10°. Accordingly, the antenna may cover a correspondingly large azimuth field-of-view of at least +/−50°, or of at least +/−75°, and the improved radome design may guarantee reduced reflection at high angles. The antenna may thus be considered as a wide (or ultra-wide) field-of-view radar antenna in the azimuth, which may allow for scanning a large horizontal area in front of e.g. an automotive vehicle. The radome design according to the present invention ensures an improved quality of the detection properties of the antenna at large angles. The overall field-of-view of the system is increased with the inventive radome design.

In various implementations, the wave-shaped structure extends over an area of the interior surface of the radome at least covered by the antenna's field-of-view. In other words, at least the part of the interior surface of the radome exposed to the electromagnetic waves radiated from the antenna may be provided with the wave-shaped structure. Outside of the antenna's field-of-view, the interior surface of the radome may be structured differently, or even be flat if deemed convenient.

In various implementations, the height of the wave-shaped structure is in the range of about ¼ of a wavelength corresponding to the operating frequency of the antenna. In various implementations, the operating frequency of the antenna is in the range of 76-81 GHz, and the height of the wave-shaped structure is about 1 mm. The height of the waves should be somewhere close to ¼ of the antenna's wavelength. It will be appreciated that tolerances are covered, wherein the tolerances may be in the range of +/−20%. In various implementations, the height of the wave-shaped structure is 1.0+/−0.2 mm. Such dimensions allow for improved coupling of the electromagnetic waves radiated from the antenna into the radome, particularly if the antenna operates in the 76-81 GHz range, as in various implementations.

In various implementations, the minimum distance between the antenna and the interior surface of the radome is in the range of 0.5 to 5 mm or 1 to 3 mm. The minimum distance may be at the boresight of the radome, i.e. at zero-degree angle-of-incidence. These distances allow for proper shielding of the antenna from environmental influences and for proper coupling of the electromagnetic waves into the radome.

In various implementations, the interior surface of the radome comprises a flat plane or a bent plane. In various implementations, the wave-shaped structure is located on the flat plane or on the bent plane. With a flat plane, the wave-shaped structure may be considered as a two-dimensional surface with a wave-form, i.e. the bulges and recesses being oriented along the orthogonal third dimension. Such a design allows for easy and cost-efficient manufacturing. With a bent plane, the overall interior surface may at least partially be bent in a concave manner around the antenna. On this generally bent plane of the interior surface, the features of the wave-shaped structure may be positioned. Such a design allows for improved transmission characteristics, as the bent orientation may provide for improved incident angles.

In various implementations, a first wave propagation direction of the wave-shaped structure is parallel to an azimuth plane of the antenna. In one embodiment, the wave-shaped structure may be characterized by a first wave function, wherein the wave propagation direction corresponding to the first wave function is parallel to an azimuth plane of the antenna. The wave function may be a periodic function, e.g. a sine function. The wave form may extend along a direction being parallel to the azimuth plane of the antenna. The electromagnetic waves radiated by the antenna in the azimuth plane thus impinge on the interior surface of the radome in an optimal manner with a low incident angle, such that the overall characteristics of the system are optimized in the azimuthal plane.

Generally, the first wave function characterizing wave-shaped structure may be any periodic function. The alternating recesses and bulges may have the same radii, or different radii on at least part of the interior surface of the radome. In various implementations, the radii of the recesses are larger than the radii of the bulges on at least part of the interior surface of the radome, which provides for improved characteristics of the radome.

In various implementations, a second wave propagation direction of the wave-shaped structure is parallel to an elevation plane of the antenna. In one embodiment, the wave-shaped structure may thus also be characterized by a second wave function, wherein the wave propagation direction corresponding to the second wave function is parallel to an elevation plane of the antenna. The first wave propagation direction and the second wave propagation direction may thus be orthogonal to each other. Apart from the direction, both the respective first wave function and the second wave function may be the same or different, i.e. the structure of the waves in the two directions may be identical. By providing for such a structuring along the elevation direction, the overall characteristics of the system can be further optimized to provide for an improved field-of-view.

In various implementations, the surface of the wave-shaped structure is uniform in a direction parallel to an elevation plane of the antenna. Thus, the interior surface of the radome may be structured such that is features only one wave-like form along one direction, particularly along the azimuth plane of the antenna. This allows for reduced manufacturing efforts.

In various implementations, the wave-shaped structure comprises circular or oval waves. Such waves may propagate around the boresight of the radome, i.e. around the point of the radome at zero-degree angle-of-incidence. With such an areal structuring of the interior surface of the radome, the transmission characteristics can be further optimized.

In various implementations, the antenna comprises an array of antenna elements, such as a planar array of antenna elements. The interior surface of the radome is parallel to the array of antenna elements. The skilled person understands that with such a configuration, each element of the array may be oriented to the same structuring of the radome's interior surface, so that calibration and thus the overall performance of the system can be improved.

In various implementations, the wave-shaped structure comprises a rough surface profile. The rough surface profile may be characterized by an arithmetic average of the roughness profile Ra of less than $\frac{1}{10}$ of a wavelength corresponding to the operating frequency of the antenna. In various implementations, the Ra is larger than $\frac{1}{1000}$ of the antenna's wavelength or larger than $\frac{1}{100}$ of the antenna's wavelength. The rough surface profile may be a random surface. The roughness is added to the overall wave-shape of the interior surface. In this manner, reflections of the radome's interior surface are further reduced.

In various implementations, also an outer surface of the radome, opposite to the interior surface of the radome, at least partially comprises an outer wave-shaped structure. With this design, the coupling of the electromagnetic waves in and out of the radome at the outer side facing the environment may be improved. In various implementations, the outer wave-shaped structure corresponds to the wave-shaped structure of the interior surface. This reduces manufacturing efforts.

In various implementations, a wave-shaped surface as descried herein may also be provided on different surfaces behind the radome. For example, the waves emitted from the antenna may first transmit through the radome with the wave-shaped interior surface, and subsequently face a further element (e.g. vehicle facia, bumper, cover, emblem, etc.) which also features a wave-shaped surface as descried herein. This may further improve the overall quality of the system.

In various implementations, the system comprises several antennas, for example several transmit and/or receive antennas. The wave structures may be provided in the field-of-view of selected (or all) transmit antennas.

According to another aspect of the invention, a radome for a radar system is provided. The radome has a surface which at least partially comprises a wave-shaped structure configured to reduce reflections of electromagnetic waves off the interior surface and to increase transmission of electromagnetic waves through the radome. The skilled person understands that the radome may be defined as described above with regard to the claimed system, and that the corresponding above specifications similarly apply for the radome itself.

According to another aspect of the invention, a vehicle is provided, such as a land vehicle, which may be an automotive vehicle. The vehicle comprises a system, particularly a radar system, as described herein. In various implementations, the vehicle comprises a radar system and a radome system as described herein.

A further aspect of the invention relates to the use of a system, particularly a radar system for automotive application as described herein.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 7 illustrates an automotive radar system according to one embodiment of the invention.

FIG. 8 illustrates a section of the system of FIG. 7 in a different orientation.

FIG. 9 illustrates a vehicle according to a further embodiment of the invention.

DETAILED DESCRIPTION

Figure 1:
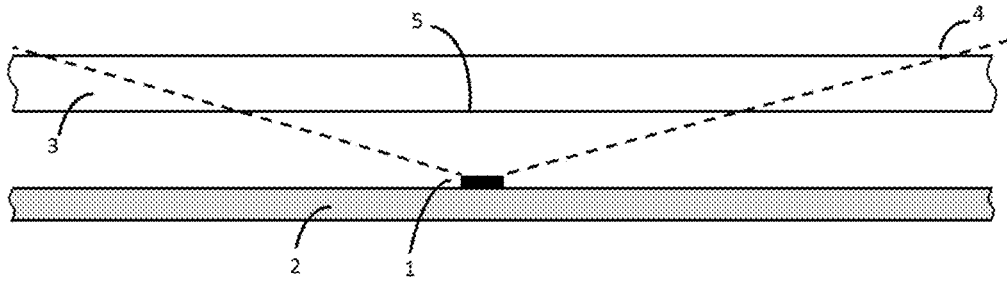
FIG. 1 illustrates a prior art design of an automotive radar system.

In the drawings, reference numbers may be reused to identify similar and/or identical elements.

Figure 3:
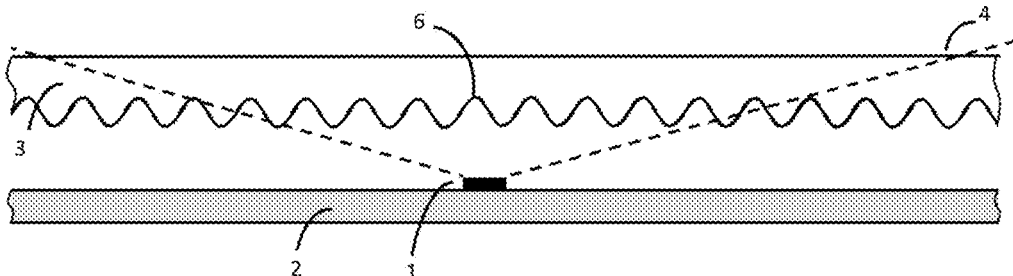
FIG. 3 illustrates an automotive radar system according to one embodiment of the invention.

FIG. 3 illustrates an example automotive radar system. The skilled person understands that the described principles and designs of a radar system also apply to applications different from automotive applications. As described with reference to FIG. 1, the system comprises an antenna 1 (comprising e.g. one or more antenna arrays) placed on an antenna board 2. The skilled person understands the antenna 1 (e.g. any common radar antenna) may be part of a sensor system which includes electronics for transmitting and receiving signals, and for analyzing the received signals. In an example, the antenna 1 works in the range of 76-77 GHz.

At a distance of 2 mm to the antenna 1, a radome 3 is provided within the field-of-view 4 of the antenna 1. In contrast to the radome designs of the prior art, the surface of the radome 3 facing the antenna 1 is designed as a waved bottom surface 6. The waved bottom surface 6 has a wave-shaped structure within the field-of-view 4 of the antenna. The wave-shaped structure is continuous and steady, not featuring any edges or other disrupt transitions. In the illustration of FIG. 3, a wave propagation direction of the wave-shaped structure is horizontal from left-right, and parallel to the azimuth plane of the antenna 1. In an example, the wavelength of the waved-shaped structure, i.e. the distance between two adjacent protrusions (schematically illustrated in FIG. 4), is 1.7 mm, in any case less than the wavelength of the operating frequency of the antenna 1. Further in this example, the height of the wave-shaped structure is about 1.0 mm, or 1.0+/−0.2 mm (schematically illustrated in FIG. 4).

Figure 2:
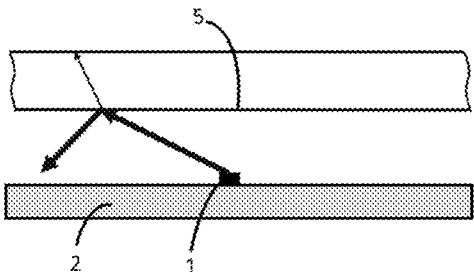
FIG. 2 illustrates the path of an electromagnetic ray in the prior art system of FIG. 1.
Figure 4:
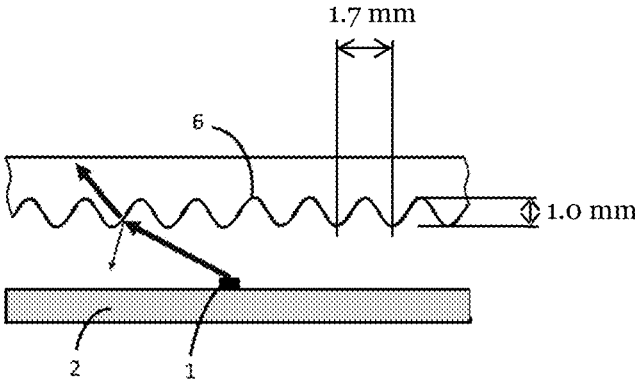
FIG. 4 illustrates the path of an electromagnetic ray in the system of FIG. 3.

FIG. 4 illustrates an example path of an electromagnetic wave radiated from the antenna 1 at a large emission angle, comparable to the situation illustrated in FIG. 2. However, due to the waved bottom surface 6, the incident angle of the wave impinging on the radome 3 is relatively low, such that only a small portion of the radiation is reflected and a large part of the radiation can transmit the radome 3. This underlines the advantageous effect of the claimed radome design, which can be manufactured without excessive efforts.

Figure 5:
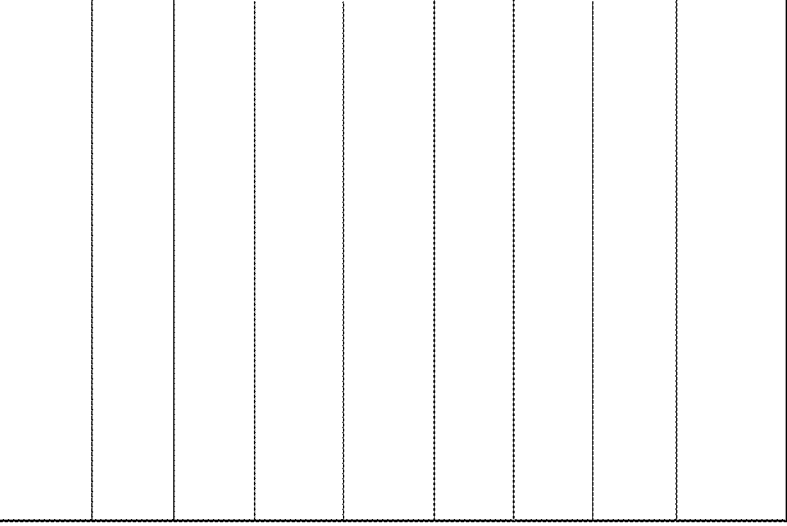
FIG. 5 illustrates a radome according to a further embodiment of the invention.

FIG. 5 illustrates a plain view of the surface of a radome facing the antenna according to another embodiment, which may correspond to the wave bottom surface 6 of FIGS. 3 and 4. The surface has a wave-shaped structure, with periodically repeating wave elements. The waved shape extends alone one dimensional, here horizontal left-right.

Figure 6:
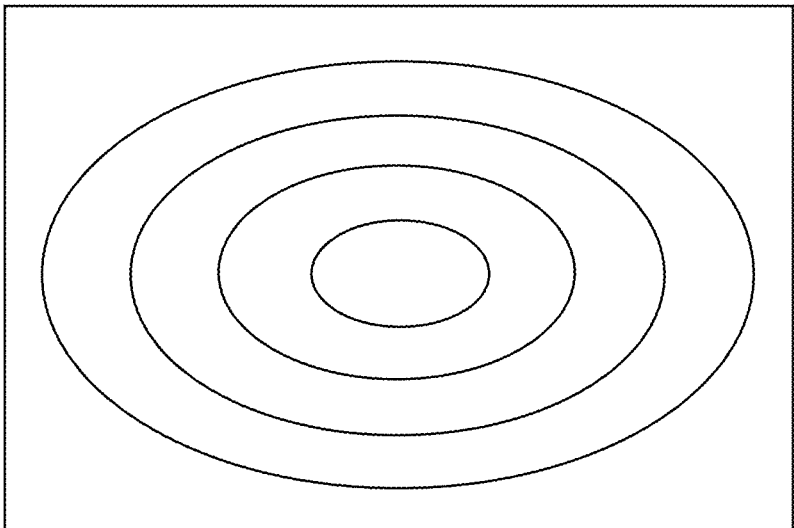
FIG. 6 illustrates a radome according to a further embodiment of the invention.

FIG. 6 illustrates a plain view of the surface of a radome facing the antenna according to another embodiment. The wave-shaped structure is oval-shaped. The center of the shape is at the boresight of the radome, i.e. at zero-degree angle-of-incidence of the waves radiated from the antenna. The waves radiated from the antenna in a direction perpendicular to the antenna board are impinging on the radome at the center of the oval-shaped structure, where the incident angle is very low. For waves emitted at larger angles, the oval-shaped structure decreases on average the incident angle and thus prevents reflection of the waves off the radome. The oval-shaped structure allows for optimizing the transmission characteristics along the azimuth and elevation. Depending on the design and shape of the antenna, and depending on the respective application of the system, the wave-shaped structure may also be circular-shaped.

FIG. 7 illustrates a radar system comprising an antenna board 2 with two antennas 1 provided thereon. The wave-shaped surface 6 of the radome faces the antennas 1. The radome is secured to the antenna board.

FIG. 8 illustrates the system of FIG. 7 in a different perspective. As can be seen, the wave-shaped surface 6 comprises elongated recesses which are equally sized and aligned parallel to one another. Between the recesses, bulges with rounded circumferences are provided. No edges or other disrupt transitions are provided. The radii of the recesses are larger than the radii of the bulges. This design results in improved transmission characteristics of the radome.

FIG. 9 illustrates a vehicle 10 comprising a radar system 11 as described herein. The radome of the radar system 11 is formed by the bumper of the vehicle 10, i.e. part of the automotive facia is formed by the radome.

Figure 10:
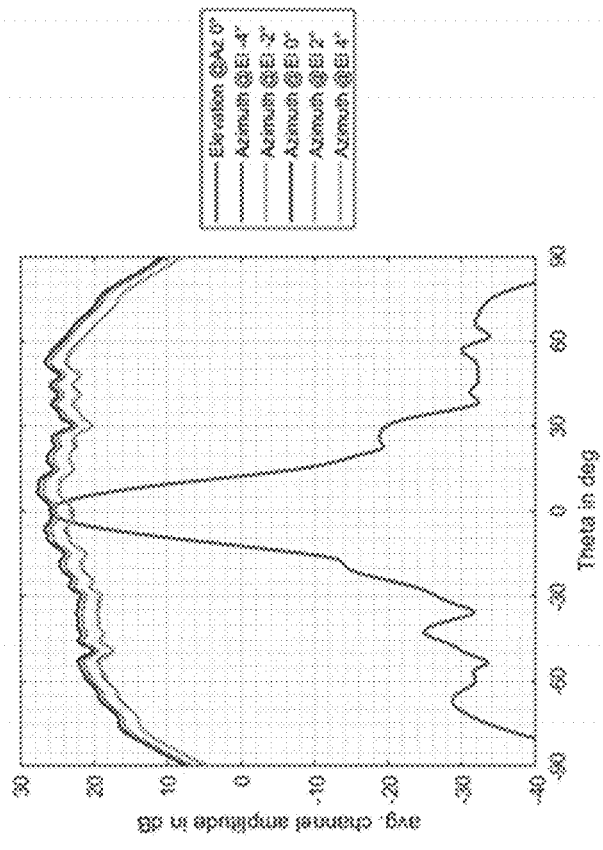
FIG. 10 illustrates the characteristics of a radome design according to the present invention compared to the characteristics of a prior art flat radome design.
Figure 10:
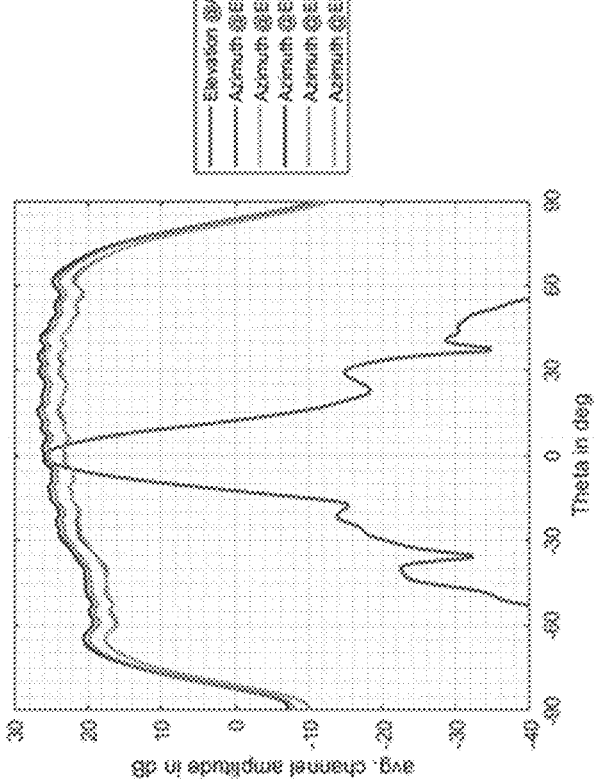

FIG. 10 illustrates transmission characteristics of radar systems with different radome designs (left: radome with flat interior surface; right: radome with a wave-shaped interior surface according to the present invention). Transmission values are illustrated for azimuth angles ranging from −90 degree to +90 degree, at elevation angles of −4 degree, −2 degree, 0 degree, +2 degree, and +4 degree. Further, as can be seen as a distinct separate line, transmission values are illustrated for varying elevation angles at an azimuth angle of 0 degree.

For the radome design with the flat interior surface, losses at high azimuth angles can be identified. These losses are mostly remedied with the radome design with the wave-shaped interior surface according to the present invention. Also for high elevation angles, the transmission is improved with the inventive radome design.

The skilled person understands that different parameters (thickness of the radome, amplitude of the wave-form, wavelength of the wave-form, distance of the radome to the antenna) can be varied to obtain optimized desired transmission characteristics, wherein these parameters are further dependent on the material of the radome.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. A system comprising:
an antenna configured to emit electromagnetic waves; and
a radome having an interior surface facing the antenna, wherein:
the interior surface at least partially includes a wave-shaped structure configured to reduce reflections of the electromagnetic waves off the interior surface and to increase transmission of the electromagnetic waves through the radome,
the interior surface of the radome includes a bent plane,
the wave-shaped structure is located on the bent plane,
a wavelength characterizing the wave-shaped structure is smaller than a wavelength corresponding to an operating frequency of the antenna, and
a first wave propagation direction of the wave-shaped structure is parallel to an azimuth plane of the antenna.

2. The system of claim 1 wherein the wave-shaped structure is formed by a plurality of alternating bulges and recesses.

3. The system of claim 1 wherein the wavelength characterizing the wave-shaped structure is smaller than half of the wavelength corresponding to the operating frequency of the antenna.

4. The system of claim 1 wherein the wavelength characterizing the wave-shaped structure corresponds to a distance between two adjacent recurring wave structure elements.

5. The system of claim 4 wherein the wavelength characterizing the wave-shaped structure corresponds to the distance between two adjacent recurring bulges or recesses.

6. The system of claim 1 wherein the operating frequency of the antenna is operating in the millimeter wave frequency band.

7. The system of claim 6 wherein:
the operating frequency of the antenna is operating in a range of 76-81 GHz; and
the wavelength characterizing the wave-shaped structure is smaller than 3.7 mm.

8. The system of claim 7 wherein the wavelength characterizing the wave-shaped structure is smaller than 2.0 mm.

9. The system of claim 1 wherein the wave-shaped structure extends over an area of the interior surface of the radome covered by a field-of-view of the antenna.

10. The system of claim 1 wherein:
a height of the wave-shaped structure is in a range of about 1/4 of a wavelength corresponding to the operating frequency of the antenna,
the operating frequency of the antenna is in a range of 76-81 GHz, and
the height of the wave-shaped structure is about 1 mm.

11. The system of claim 1 wherein a minimum distance between the antenna and the interior surface of the radome is in a range of 0.5 to 5 mm.

12. The system of claim 11 wherein the minimum distance between the antenna and the interior surface of the radome is in a range of 1 to 3 mm.

13. The system of claim 1 wherein the bent plane of the radome facing the antenna forms a reflex angle.

14. The system of claim 1 wherein at least one of:
a second wave propagation direction of the wave-shaped structure is parallel to an elevation plane of the antenna, or
the surface of the wave-shaped structure is uniform in a direction parallel to an elevation plane of the antenna.

15. The system of claim 1 wherein:
the antenna includes an array of antenna elements that is a planar array of antenna elements; and
at least a portion of the interior surface of the radome is parallel to the array of antenna elements.

16. The system of claim 1 wherein the wave-shaped structure includes a rough surface profile with an arithmetic average of the roughness profile Ra of less than 1/10 of a wavelength corresponding to the operating frequency of the antenna.

17. A radome for a radar system, the radome comprising a surface that at least partially includes a wave-shaped structure configured to:
reduce reflections of electromagnetic waves off an interior surface of the radome; and
increase transmission of electromagnetic waves through the radome, wherein:
the interior surface of the radome includes a bent plane,
the wave-shaped structure is located on the bent plane,
a wavelength characterizing the wave-shaped structure is smaller than a wavelength corresponding to an operating frequency of an antenna, and
a first wave propagation direction of the wave-shaped structure is parallel to an azimuth plane of the antenna.

18. A vehicle comprising:
the radome of claim 17; and
the radar system.

* * * * *